United States Patent [19]

Kohno et al.

[11] 4,271,708
[45] Jun. 9, 1981

[54] ULTRASONIC MEASURING APPARATUS

[75] Inventors: Masaru Kohno; Yukio Nakagawa, both of Hino, Japan

[73] Assignee: Fuji Electric Co., Ltd., Kawasaki, Japan

[21] Appl. No.: 35,467

[22] Filed: May 3, 1979

[30] Foreign Application Priority Data

May 16, 1978 [JP] Japan .................................. 53-57820
May 22, 1978 [JP] Japan .................................. 53-60745

[51] Int. Cl.$^3$ .............................................. G01F 1/66
[52] U.S. Cl. ................................................. 73/861.28
[58] Field of Search ................ 73/194 A, 597, 861.27, 73/861.28

[56] References Cited

U.S. PATENT DOCUMENTS

| 3,818,757 | 6/1974 | Brown | 73/194 A |
| 3,894,431 | 7/1975 | Muston et al. | 73/194 A |
| 4,028,938 | 6/1977 | Eck | 73/194 A |

Primary Examiner—Charles A. Ruehl
Attorney, Agent, or Firm—Spencer & Kaye

[57] ABSTRACT

An ultrasonic measuring apparatus of the type having a pair of transducers disposed oppositely on a pipe through which a fluid to be measured flows and which are so controlled alternately as to convert an input electrical signal to an acoustic signal and to convert a received acoustic signal to a received electrical signal. The apparatus includes a time difference detecting means for receiving an output signal from a delay means and the received electrical signal for detecting a time difference between a delayed counting time obtained from the delay means and a propagating time required for an ultrasonic wave to propagate through the fluid to be measured. Comparing means are provided for comparing a voltage signal corresponding to the time difference with first and second set voltages and monitoring means receiving the comparison result from the comparing means for judging whether the fluid flow is propagated in the pipe in a normal condition or in an abnormal condition. The present invention ensures a quick detection of abnormal propagation of the ultrasonic wave in the pipe and obtains a correct measurement values without misjudgement.

13 Claims, 14 Drawing Figures

ULTRASONIC MEASURING APPARATUS

BACKGROUND OF THE INVENTION

1. Field of the Invention

The present invention relates to an ultrasonic measuring apparatus of the type having a pair of transducers disposed oppositely on a pipe through which a fluid to be measured flows and which are so controlled alternately as to convert an input electrical signal to an acoustic signal and to convert a received acoustic signal to a received electrical signal, oscillating means having a variable oscillating frequency, a counter for counting the output signal from the oscillating means to produce an output signal when the count value of the counter reaches a predetermined value, a delay means for delaying the output signal from the counter, a transmitter receiving the output signal from the oscillating means for producing the input electrical signal, a time difference detecting means receiving the output signal from the delay means and the received electrical signal for detecting the time difference between the delayed counting time obtained from the delay means corresponding to the counting time that the counter counts the output signal from the oscillating means up to the predetermined value and the propagating time required for an ultrasonic wave to propagate through the fluid to be measured, controlling means for controlling the oscillating frequency of the oscillating means so as to make the time difference zero, and means for detecting the propagating time in accordance with the oscillating frequency of the oscillating means. A frequency difference between the oscillating frequency when the ultrasonic wave is emitted into the flow in a forward direction with respect to the flow direction and the oscillating frequency when it is emitted in a backward direction with respect to the flow direction is used to measure the flow speed or flow rate.

2. Prior Art

An ultrasonic flow rate measuring apparatus of this type is disclosed in an article "Fuji Ultrasonic Flowmeter" on pp 29 to 38 of "Fuji Giho" published by Fuji Electric Co., Ltd., Vol. 48, No. 2. The construction of this conventional ultrasonic flow rate measuring apparatus is shown in FIG. 1. In FIG. 1, reference numeral 10 designates a measuring pipe through which a fluid flows in the direction of the arrow. Mounting elements 15 and 16 mount transducers 13 and 14 on the outer surface of the pipe 10.

The transducers 13 and 14 convert acoustic signals into electric signals and vice versa. In one operation mode, the transducer 13 serves as a transmitter and the transducer 14 serves as a receiver. In another operation mode, the transducer 14 operates as an acoustic transmitter and the transducer 13 as an acoustic receiver. These modes are changed one to the other by a mode changer 9. The mode changer 9 produces mode switch signals A and B, which control the transducers 13 and 14 via a gate circuit 6 so as to alternately serve as the transmitter and the receiver.

In the figure, reference numeral 1 designates an oscillator unit having a pair of voltage controlled oscillators 11 and 12 and controllers 19 and 20. In the oscillator unit 1, the control voltages are varied by the controllers 19 and 20 in accordance with the output signal from a time difference detector 8 so that the oscillating frequencies are varied. The mode change signals A and B also control the controllers 19 and 20 in such a way that, in a given mode, one of the oscillators 11 and 12 accepts the output signal from the time difference detector 8. Reference numeral 2 designates a synchronizing (sync) pulse generator for producing a signal in synchronism with the output signal of the oscillator 11 or 12 selected by the mode changer 9. Reference numeral 3 designates a counter for counting the output signal from the oscillator unit 1. The counter 3 starts its counting operation in response to the output signal from the synchronizing pulse generator 2. When the count value of the counter 3 reaches a given value N, it produces a count operation end signal. Reference numeral 4 designates a delay circuit which initiates its operation in response to the output signal from the counter 3 to produce an output signal after a given time lapse. The delay time $\tau_d$ of the delay circuit 4 is substantially equal to the total time $\tau$ of the time taken for an ultrasonic wave propagating through the measuring pipe 10 and the time taken for an electrical signal to pass through a transmitter 5 and a receiver 7. The output signal V from the delay circuit 4 is led to the time difference detector 8. The transmitter 5 transmits an electrical signal to drive the transducers 13 and 14 on the basis of the output signal from the sync pulse generator 2. The output signal from the transmitter 5 is selectively applied through the gate circuit 6 to the transducer 13 or 14. Similarly, the receiving signal received by the transducer 13 or 14 is led through the gate 6 to the receiver 7.

The receiver 7, upon the detection of the receiving signal, produces a trigger signal Z to control the time difference detection circuit 8. As shown in FIG. 2 illustrating a circuit diagram of the time difference detector 8, a NAND gate 100 is provided in the prestage of the circuit. To the NAND circuit 100 a trigger signal Z from the receiver 7 and an output signal V from the delay circuit 4 are applied. When those signals Z and V coincide with each other causing the NAND gate 100 produce an output signal F of logical "1", the transistor Q1 which has been conductive is turned off so that charge current flows from a constant current circuit 90 into a capacitor through a diode D1 to charge the capacitor C. The constant current circuit 90, the transistor Q1, the diode D1 and the capacitor C cooperatively form a ramp circuit. The output signal of the ramp circuit, i.e., the charge voltage across the capacitor C, is led to a differential amplifier 80. A set voltage E50 for measuring the propagation time is preset in the differential amplifier 80 and the difference voltage between the output signal R from the ramp circuit and the set voltage E50 is derived as an output signal S from the time difference detector 8. This output signal S is led to the controllers 19 and 20 in the oscillator unit 1. The control voltages of the oscillators 11 and 12 are so controlled that the difference voltage becomes zero. As a result, the oscillating frequency is varied and the varied frequency is counted by the counter 17 to be converted into a propagation time t which is then applied to a display unit 18. A field effect transistor Q2 may be used to provide a path for discharging the capacitor C. The field effect transistor Q2 is controlled to perform on-off switching by a signal K. In this embodiment, the set voltage E50 may be selected to be approximately 5 V.

In operation, it is assumed that the mode change signal A is first produced from the mode changer 9 and accordingly the transducer 14 is forced to operate as the receiver and the transducer 13 is forced to operate as the transmitter, while at the same time the oscillator 11 in the oscillator unit 1 is connected to the sync pulse generator 2 and the counter 3. The gate circuit 6 is so controlled that the output signal from the transmitter 5 is led to the transducer 13 and that the output signal from the transducer 14 is led to the receiver 7. After the lapse of a given time, the delay circuit 4 produces the output signal V which interrupts the production of an output signal F from the NAND circuit 100. Accordingly, the capacitor C of the ramp circuit starts its charging. Then, the output signal is generated from the transducer 14. When the impingement of the ultrasonic wave on the transducer 14 is detected by the receiver 7, the receiver 7 stops generation of the output signal Z, so that the output signal F from the NAND circuit 100 is again produced, leading to the interruption of the charging into the capacitor C. The output signal from the ramp circuit at this time is denoted as R' hereinafter. The output signal R' is compared with the set voltage E50 and a resultant difference voltage $\epsilon$ therebetween is produced as an output signal S of the time difference detector 8. The oscillating frequency of the oscillator 11 is controlled by the difference voltage $\epsilon$. Through the repetition of such an operation, the difference voltage finally becomes zero, that is to say, the output signal R' is controlled to be equal to the set voltage E50. In this manner, when the ultrasonic pulse is emitted into the flowing fluid in the forward direction with respect to the fluid flow, the forward propagation time Ta is transformed into a corresponding oscillating frequency of the oscillator 11. In this way, the forward direction propagation time measurement is completed.

Then, the mode changer 9 produces the mode change signal B. As a result, the transducer 14 is changed to operate as the transmitter while the transducer 13 is changed to operate as the receiver. At the same time the signal B controls the oscillator 12 in the oscillator unit 1 to be connected to the sync pulse generator 2 and the counter 3. The gate circuit 6 is so controlled that the output signal from the transmitter 5 is led to the transducer 14 and the output signal from the transducer 13 is led to the receiver 7. When the ultrasonic pulses are emitted into the flowing fluid in the backward direction with respect to the fluid flow, in the same manner as mentioned above, the backward propagation time Tb is transformed into a corresponding oscillating frequency of the oscillator 12. At this point, the measurement of the backward propagation time is completed.

The frequency difference between the frequencies of the oscillators 11 and 12 is derived as a frequency difference proportional to the flow speed from the reversible counter 17 and is applied to the display unit 18 where this difference is displayed as the flow rate or flow speed.

In FIG. 1, l and t related to the measuring pipe 10 are representative of the propagation distance of the ultrasonic wave in the measuring medium and the propagation time, respectively. In the apparatus shown in FIG. 1, the counting time required for the counter 3 to count N of the oscillating frequency f of the oscillator unit 1, is expressed by N/f. In this example, a feedback loop is formed so that this counting time coincides with the acoustic wave propagation time t in the measuring medium. Therefore, at the time point that the propagation becomes stable, $N/f = t$, i.e. $f = N/t$ is obtained and therefore the frequency f thus derived is N times as long as the reciprocal of the propagation time, $1/t$. Accordingly, the propagation time t may be measured by counting the frequency f.

The ultrasonic wave is easily affected by the conditions of its propagation path. Therefore, it is necessary to carefully monitor its propagation, that is to say, whether the ultrasonic wave propagates normally or not. For such a monitoring, a conventional technique has employed the use of a signal monitor circuit (see Japanese Laid-Open patent application No. 101,668/1976) or an abnormality value removal circuit.

The above-mentioned signal monitor circuit judges whether the peak value of the receiving waveform falls within a given range or not. However, when the receiving waveform is distorted by, for example, the absorption of the ultrasonic pulse by bubbles in the flowing fluid, an erroneous signal may be generated indicating that the ultrasonic pulse has reached the receiving transducer; that is to say, a so-called mistriggering takes place. In the latter case of the abnormal value removal circuit, when the final output value (an average value over 5 seconds) is considerably different from the previous output value (an average value over 5 seconds prior to the final output), that value is judged to be abnormal. Accordingly, the final value is not derived as data while its previous value is held. The response of the flow rate measurement, therefore, is slow. Further, a sudden change of the output signal caused by a sudden change of flow speed or level might be misjudged as an abnormal situation.

SUMMARY OF THE INVENTION

Accordingly, an object of the invention is to provide an ultrasonic measuring apparatus which can detect an abnormality with a quick response and without misjudgement of correct measurement values, and which is free from mistriggering.

Another object of the invention is to provide an ultrasonic flow rate measuring apparatus which judges "the propagation of the ultrasonic pulse is normal or correct" only when, in the alternately repeated measurement of forward and backward propagation times, two successive ultrasonic pulses, i.e., a succession of forward and backward ultrasonic pulses or a succession of backward and forward ultrasonic pulses, are normally propagated.

In the present invention, for achieving the foregoing and other objects, a voltage signal corresponding to the time difference between a counting time of a counter counting the output signal from an oscillator up to a predetermined value and the time required for an ultrasonic pulse to propagate through a measuring medium, is compared with a first predetermined voltage and a second predetermined voltage. The result of the comparison is used to judge whether the ultrasonic pulse is being propagated in a normal condition or not.

In a preferred embodiment of an ultrasonic measuring apparatus according to the invention, a comparator checks whether a first voltage signal corresponding to the time difference between the counting time and the propagation time when an ultrasonic pulse is emitted in a forward direction with respect to the fluid flow and a second voltage signal corresponding to the time difference when it is emitted in a reverse direction with respect to the fluid flow, fall within a preselected voltage range. A shift register is provided for detecting whether the first and second voltage signals continuously fall within the preselected voltage range. The output signal from the shift register is used to judge whether the ultrasonic pulses in the forward and backward directions are propagated normally in succession or not.

In another preferred embodiment of this invention, a difference voltage between a voltage signal corresponding to the time difference and a reference voltage is obtained. The oscillating frequency of the oscillator is controlled so as to make the difference voltage zero. In this embodiment, the preselected voltage range is set between a first set voltage slightly higher than the reference voltage and a second set voltage slightly lower than the reference voltage.

Other objects and features of the invention will be apparent from the following description, by way of nonlimiting embodiments of this invention, taken in conjunction with the accompanying drawings, in which:

DESCRIPTION OF THE PREFERRED EMBODIMENTS

Figure 1:
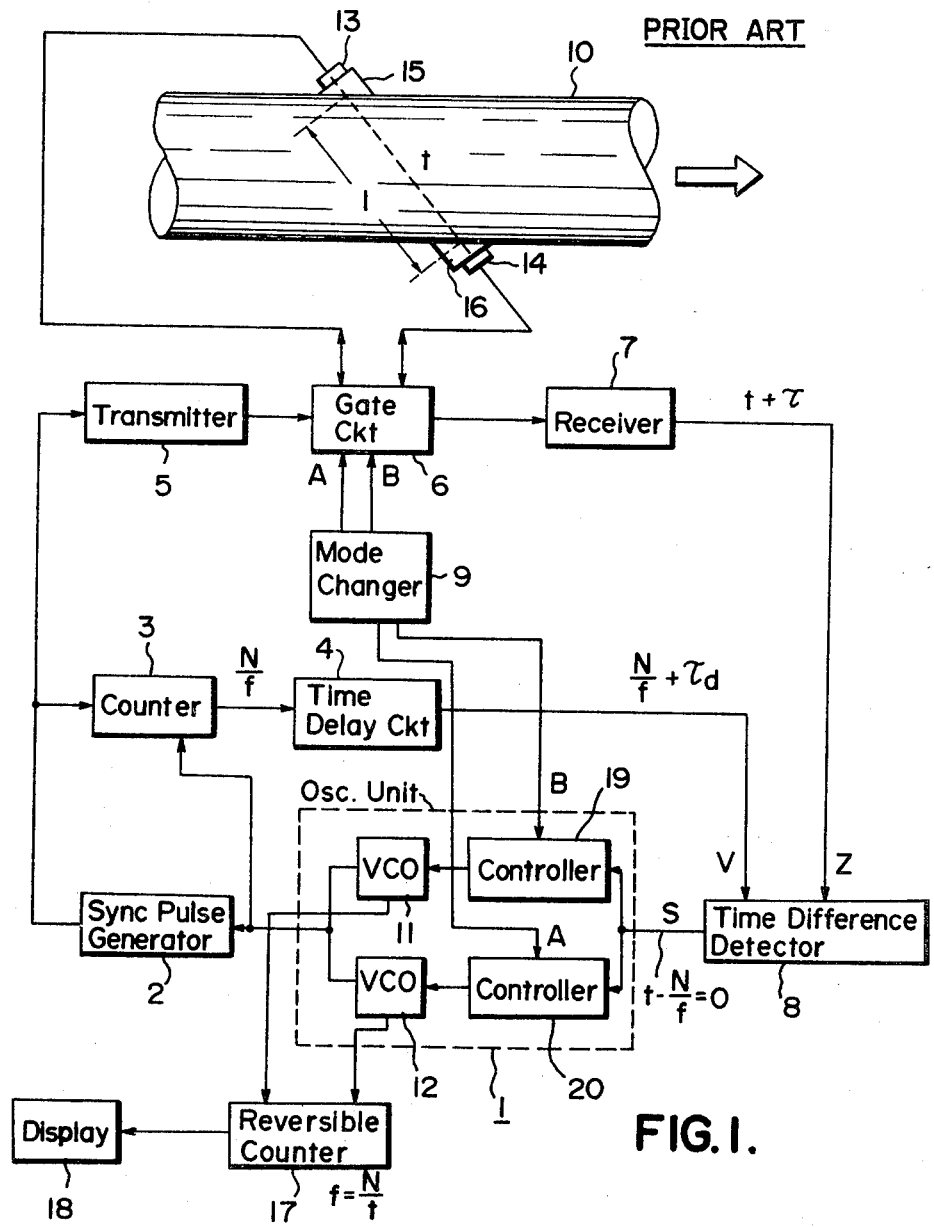
FIG. 1 is a block diagram showing the circuit arrangement of a conventional ultrasonic flow rate measuring apparatus.
Figure 2:
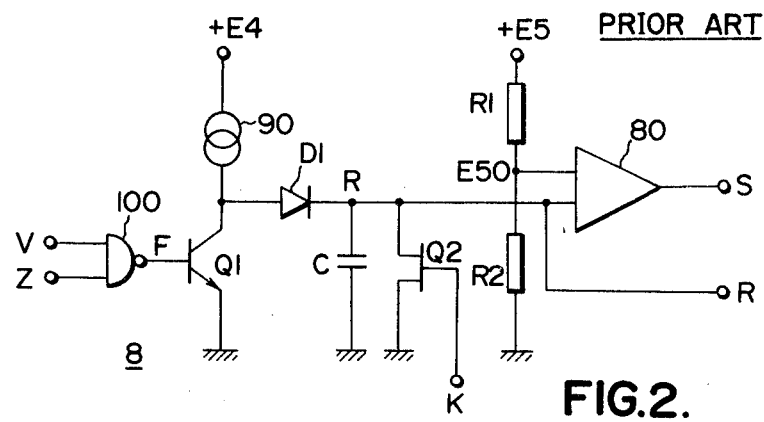
FIG. 2 is a circuit diagram showing a time difference detector used in the circuit shown in FIG. 1.
Figure 3:
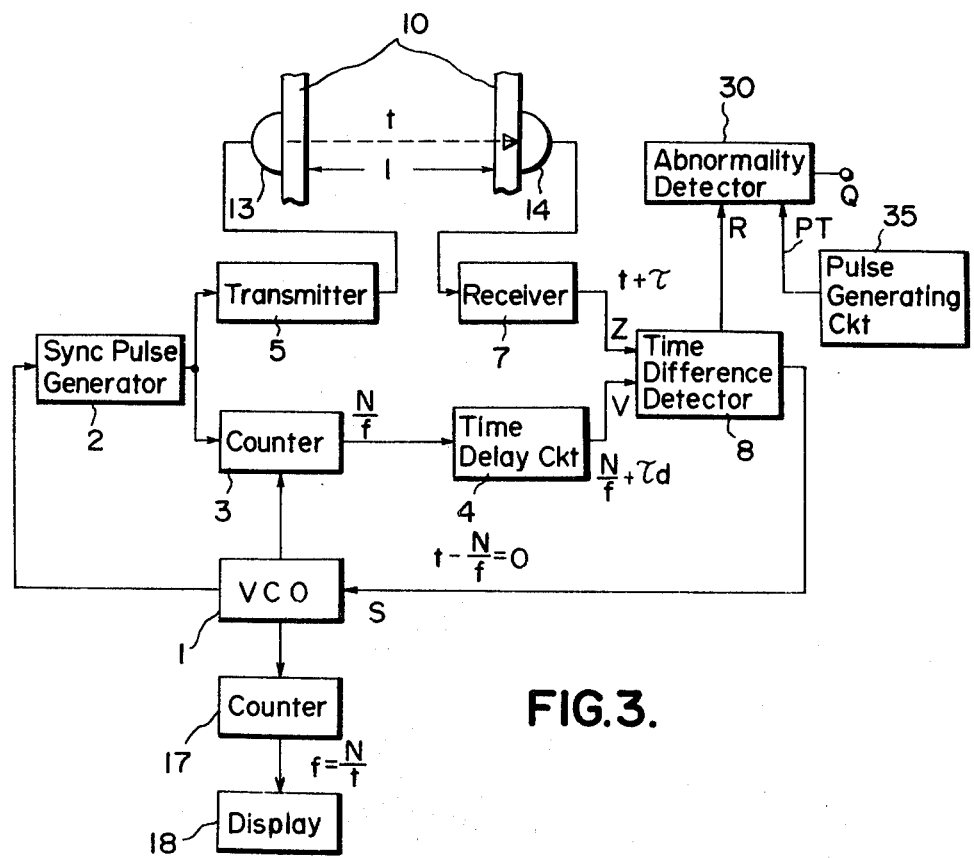
FIG. 3 is a block diagram showing an embodiment of an ultrasonic flow rate measuring apparatus according to the invention.
Figure 4:
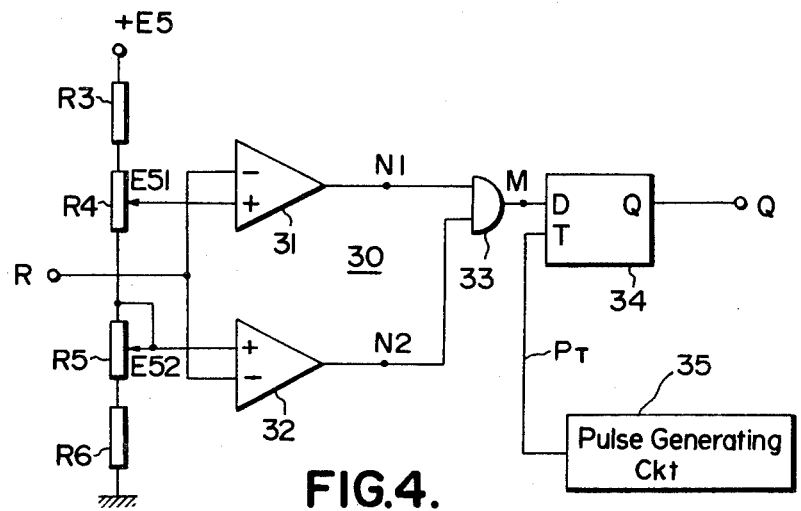
FIG. 4 is a circuit diagram showing an abnormality detector used in the circuit shown in FIG. 3.

Referring now to FIG. 3, there is shown a preferred embodiment of an ultrasonic flow rate measuring apparatus according to the invention. In FIG. 3, the same numerals as in FIG. 1 are used to designate like portions in FIG. 1. As shown, this embodiment uses an abnormality detector 30 for judging whether the arrival detection of an acoustic wave is normal or not. The abnormality detector 30 receives the output signal R from the ramp circuit in the time difference detector 8 and a pulse signal $P_T$ derived from a pulse generator 35, which will be described in detail later. As shown in FIG. 4, the abnormality monitor circuit 30 may be comprised of comparing circuits 31 and 32, AND gate 33 and a D type flip-flop 34. Fixed resistors R3 and R6, variable resistors R4 and R5, and a power source E5 cooperatively apply set voltages E51 and E52 to the positive input terminals (+) of the comparing circuits 31 and 32, respectively. The set voltage E51 is set slightly higher than the reference voltage E50 shown in FIG. 2. On the other hand, the set voltage E52 is set slightly lower than the reference voltage E50.

In the present invention, for the purpose of judging whether the arrival detection of the acoustic wave is normal or not, the output signal R from the ramp circuit in the time difference detector 8, that is to say, the voltage across the capacitor C, is introduced to the negative input terminals (−) of the comparators 31 and 32. When the output signal R is below the set voltage E51, the output signal N1 from the comparator 31 is a logical "1". When the signal R exceeds the set voltage E52, the output signal N2 from the comparator 32 is also a logical "1". The output signals N1 and N2 from the comparators 31 and 32 are applied to the AND gate 33, the output signal from which is applied to the D-input terminal of the D type flip-flop 34. The pulse generator 35 applies a pulse signal $P_T$ of logical "1" to the T input terminal of the D type flip-flop 34. The pulse signal $P_T$ of logical "1" is generated after the arrival of the ultrasonic wave, i.e. after the receiver 7 generates an output signal Z, and before the initiation of the next measurement period, i.e. before the next ultrasonic pulse is transmitted.

The operations of the circuits shown in FIGS. 3 and 4 will be described with reference to FIGS. 5 to 7.

Figure 5:
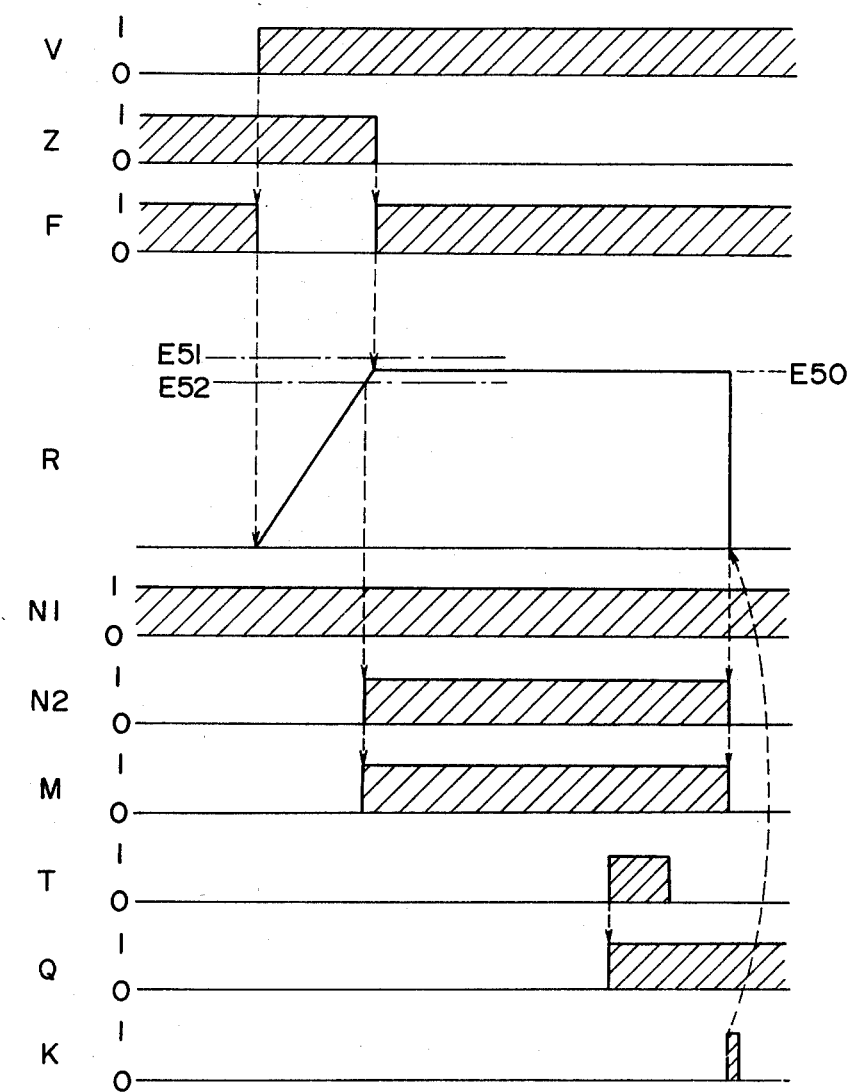
FIGS. 5 to 7 illustrate signal waveforms at the respective portions in the circuit shown in FIG. 3 which are useful in explaining the operation of the same circuit.

When the propagation of the ultrasonic wave is in a normal state, that is to say, the counting time N/f of the counter 3 is equal to the propagation time t of the ultrasonic wave and, therefore, the output voltage R of the ramp circuit is equal to the reference voltage E50, wave forms as illustrated in FIG. 5 appear at the respective circuit components and blocks in FIGS. 3 and 4. In response to the output signal V from the delay circuit 4, the output signal R from the ramp circuit of the time difference detector 8 starts increasing. At the instance that the output signal R exceeds the set voltage E52 from the abnormality detector 30, the comparator 32 starts producing an output signal N2. At this time, an output signal N1 is produced from the comparator 31. Under this condition, the AND gate 33 is fully conditioned to produce an output signal M. Then, the receiver 7 produces an output signal Z which in turn stops the rise of the output signal R from the ramp circuit. After a relatively long period of time, a pulse input signal $P_T$ is applied to the T input terminal of the D type flip-flop 34. As a result, the flip-flop 34 produces a set output Q in accordance with the D input, or the output signal M of logical "1" from the AND gate 33.

An alarm system (not shown) is preferably used with a construction such that the set output Q lights an alarm lamp during normal propagation of the ultrasonic wave, and extinguishes the alarm lamp during abnormal propagation of the ultrasonic wave. A buzzer may be employed instead of the alarm lamp. Then, the reset signal K discharges the capacitor C (FIG. 2) of the ramp circuit to complete the preparation for the following measuring cycle. Further, all of the circuits are reset in synchronism with the reset signal K or after the reset signal K. At this time, the set signal Q of the D type flip-flop 34 maintains its previous state of "1" even if the D input disappears.

Figure 6:
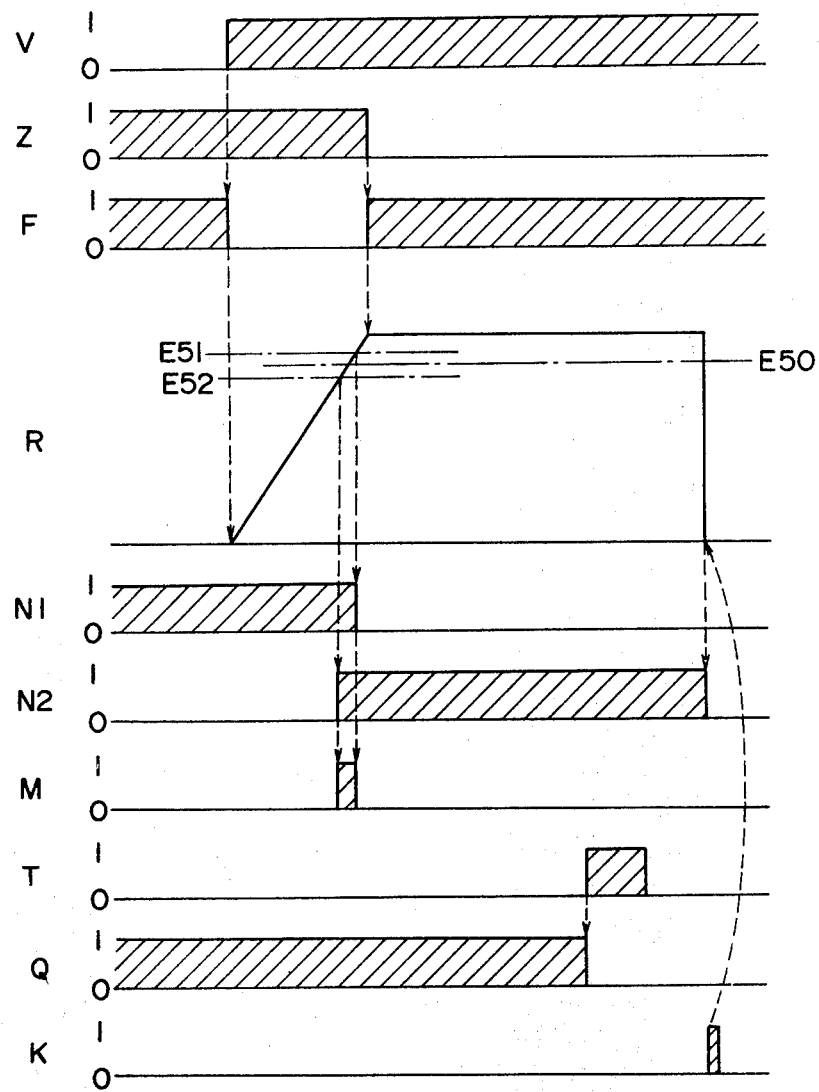
Figure 7:
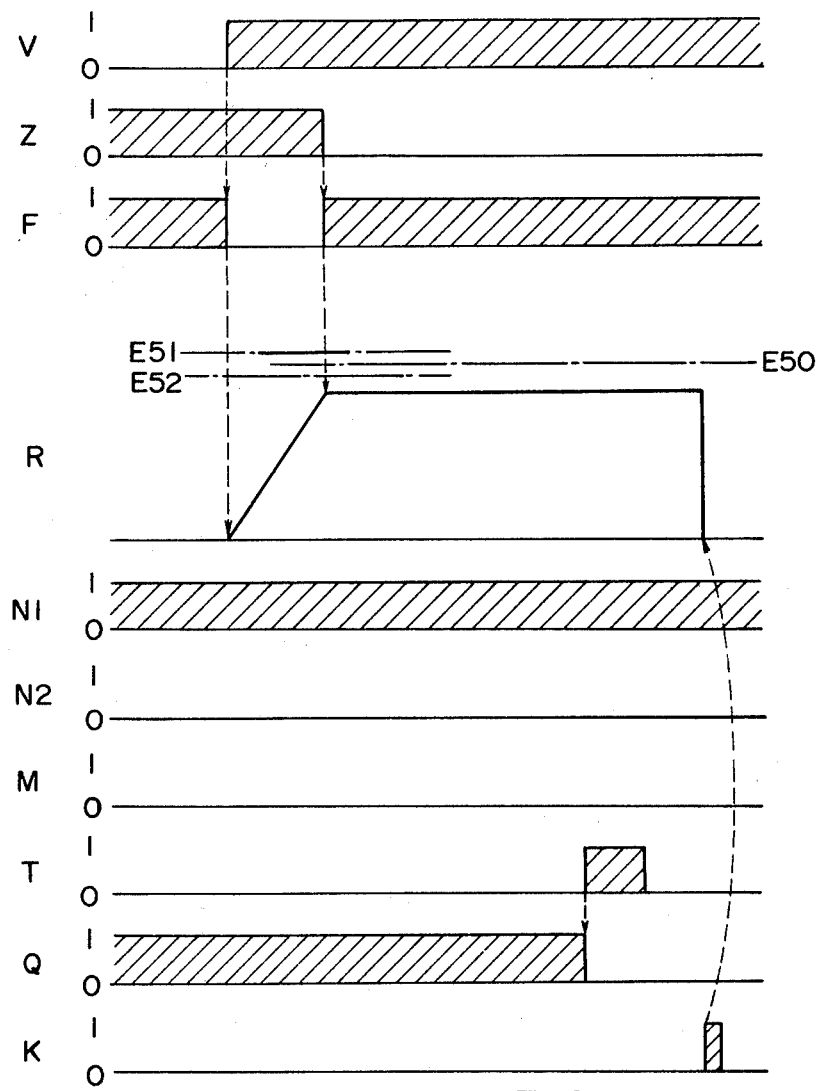

FIGS. 6 and 7 illustrate the output wave forms at the respective portions when, in the next measuring period, the abnormality takes place in the wave propagation. In the case of FIG. 6, the arrival detection of the ultrasonic wave is carried out after an abnormally long time. In the case of FIG. 7, it is carried out after an abnormally short time. In the abnormal state shown in FIG. 6, the output signal R from the ramp circuit exceeds both the set voltages E52 and E51 from the abnormality detector 30. An insufficient output signal M of "1" of the AND gate 33 is applied to the D type flip-flop 34 so that the application of a T input to the flip-flop 34 changes the output signal Q to a "0" signal. The logical "0" signal extinguishes the alarm lamp to indicate the abnormality of the ultrasonic wave. In the abnormal state of FIG. 7, the output signal R fails to reach the set voltages E51 and E52. Accordingly, the output signal M of the AND gate 33 continues its "0" state. As a result, the application of a T input to the D type flip-flop 34 renders the set signal Q to logical "0".

Figure 8:
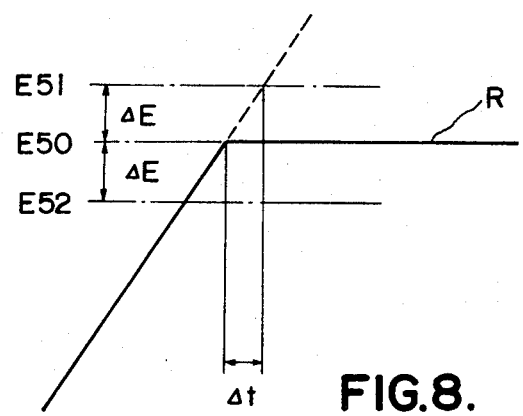
FIG. 8 is an explanatory diagram illustrating the accuracy of the abnormality detection.

The explanation to follow will be made with respect to the amount of a time difference between the propagation time t of the ultrasonic wave and the counting time N/f of the counter 3, that is to say, the accuracy of detecting whether the ultrasonic wave propagation is normal or abnormal. Reference is made to FIG. 8. In FIG. 8, it is assumed that the ascending inclination of the output signal R from the ramp circuit is 2.5 V/μs and the potential of E50 is 5 V, and that $\tau - 2 \mu s = \tau d$. When, for example, $\Delta E = 0.1$ V and $E51 = E50 + 0.1$ V and $E52 = E50 - 0.1$ V, then the time displacement $\Delta t$ in FIG. 8 is calculated as follows:

$$\Delta t = \frac{0.1[V]}{2.5[V/\mu s]} = 0.04[\mu s]$$

In the present invention, the oscillating frequency of the oscillator is controlled in a manner such that the propagation time t coincides with the counting time N/f. In this case, accordingly, it can be detected whether the time difference $$(t - \frac{N}{f})$$

falls within ±0.04 μs. In other words, the normal and abnormal states of the ultrasonic wave propagation can be checked from the output signal Q representing the judging result of the above-mentioned detection, with the measuring accuracy of ±0.04 μs.

As described above, in the flow rate measuring apparatus according to the invention, when an abnormal propagation causes a mistrigger, the output voltage R from the ramp circuit fails to fall within the range between the set voltages E51 and E52. Therefore, such a mistrigger can be monitored by comparing the output voltage R with the set voltages E51 and E52. When a sudden output change occurs due to a sudden flow rate change, for example, when there occurs a change in the propagation time, the operation of the measuring circuit system cannot follow such a change, and the output voltage R of the ramp circuit does not fall within the range between the set voltages E51 and E52. While in this case, accordingly, it is judged that the wave propagation is abnormal, the measuring circuit system can follow the change after the repetition of the measuring cycles. Once the system reaches a stable state, the output voltage R from the ramp circuit immediately fall to a value within the range between the set voltages E51 and E52. As a result, it can be judged that the ultrasonic wave propagated in a normal condition. In addition, when the transducers 13 and 14 have some failure and it is impossible to transmit and receive ultrasonic pulses, or when the ultrasonic pulses are attenuated or disappear in the course of the propagation, the ascending state of the output signal from the ramp circuit continues until the output signal is saturated with a large value. In such a case it may also be judged that the ultrasonic wave is propagated in an abnormal condition.

Figure 9:
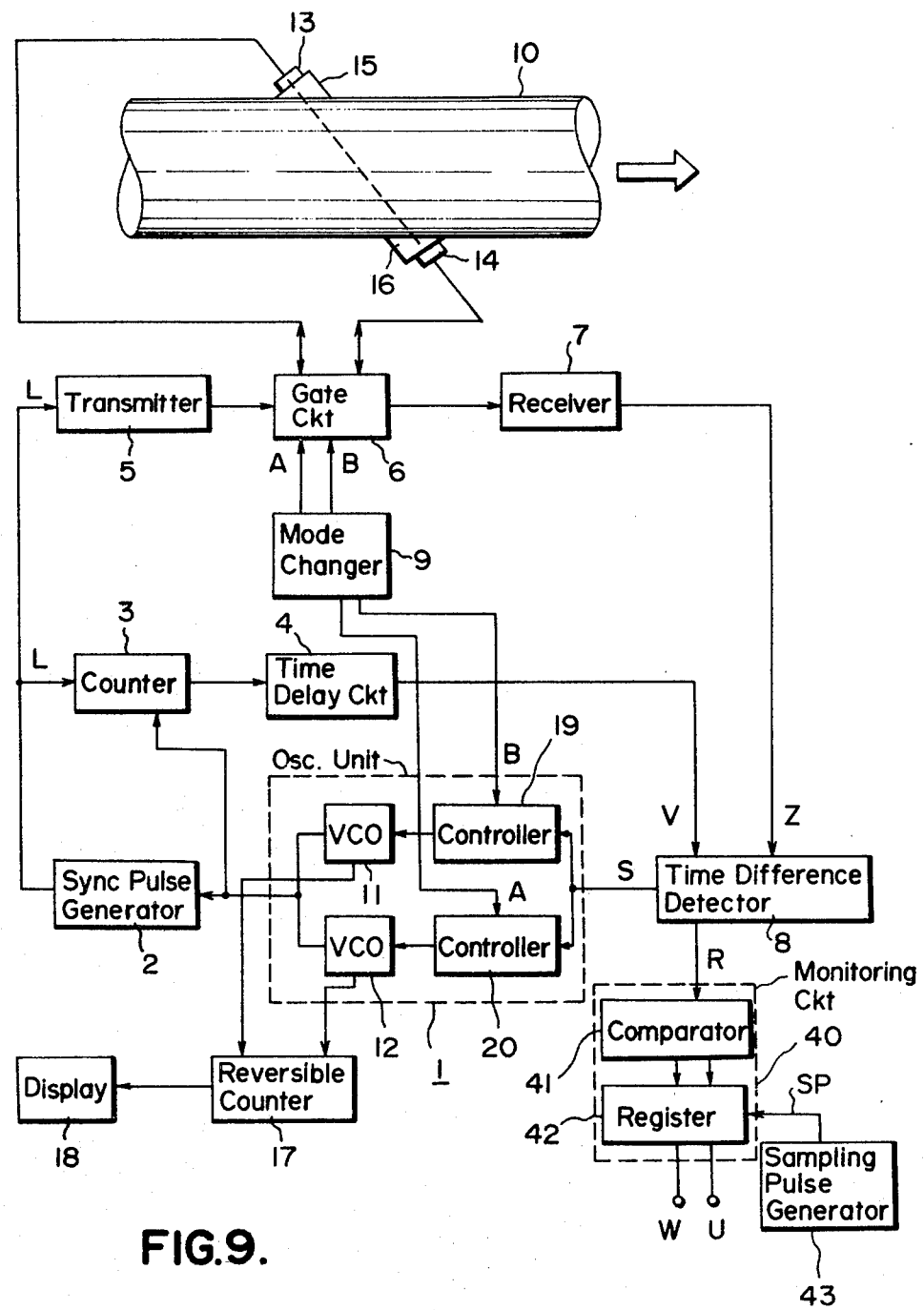
FIG. 9 is a block diagram showing another embodiment of the ultrasonic flow rate measuring apparatus according to the invention.
Figure 10:
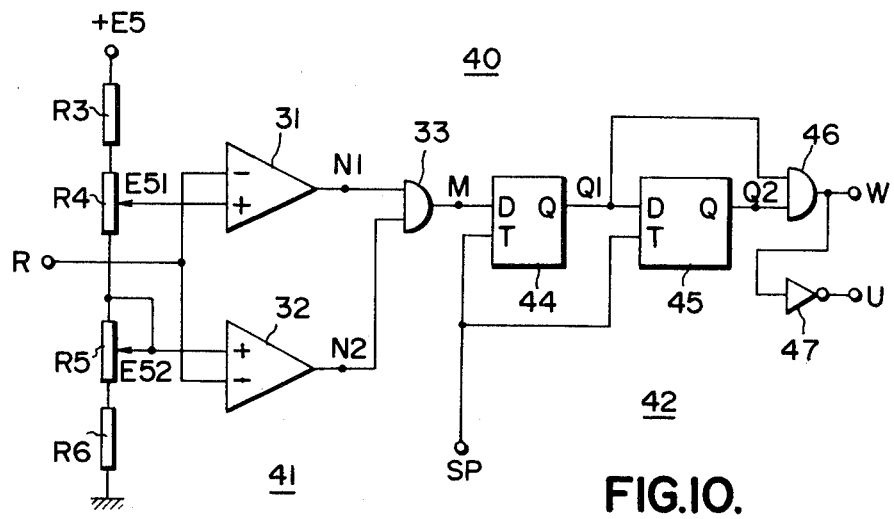
FIG. 10 is a circuit diagram showing an abnormality monitor circuit used in the circuit shown in FIG. 9.

Turning now to FIG. 9, there is shown another embodiment of the ultrasonic flow rate measuring apparatus according to the invention. In FIG. 9, the same reference numerals as in FIGS. 1 and 3 are used to designate like portions in FIGS. 1 and 3. In this embodiment of the present invention, an abnormal detector 40 is used to determine whether the ultrasonic wave is being propagated in a normal condition or not. The abnormal detector 40 is comprised of a comparator 41 for checking as to whether a value R1 of the output signal R from the ramp circuit when the ultrasonic pulse is radiated in the forward direction with respect to fluid flow direction and a value R2 of the output signal R from the ramp circuit when it is radiated in the reverse direction with respect to fluid flow direction fall within respective given voltage ranges, a register 42 for checking whether the values R1 and R2 successively fall within the given voltage ranges, and a sampling pulse generator 43 for supplying sampling pulses SP to the register 42. As shown in FIG. 10, the comparator 41 has a first comparator 31 and a second comparator 32, like the abnormal detector 30 shown in FIG. 4. The combination of fixed resistors R3 and R6 and variable resistors R4 and R5 and a power source E5 provides set voltages E51 and E52 to the comparators 31 and 32, respectively. The set voltage E51 is set at a slightly higher potential (e.g. E51=E50+0.1 V) than the reference voltage E50 while the set voltage E52 is set at a slightly lower potential (e.g. E52=E50−0.1 V). In order to judge the state of the wave propagation, the output signal R from the ramp circuit of the time difference detecting circuit 8 shown in FIG. 2 is applied to the remaining input terminals of the comparators 31 and 32. When the output signal R is below the set voltage E51, the comparator 31 produces a "1" signal, and the comparator 32 produces a "1" signal when the output signal R exceeds the set voltage E52. In FIG. 10, the register 42 is comprised of an AND gate 33 receiving the output N1 from the comparator 31 and the output N2 from the comparator 32, a D type flip-flop 44 receiving the output M from the AND circuit 33, a D type flip-flop 45 receiving the output signal Q1 from the D type flip-flop 44, and an AND gate 46 to which the output signals Q1 and Q2 from the flip-flops 44 and 45 are applied. An abnormal signal W is derived from the AND gate 46. A sampling pulse SP is applied the respective T input terminals of D type flip-flops 44 and 45. An inverter circuit 47 is connected to the output terminal of the AND gate 46 to obtain an abnormal signal U in the form of a logical "1".

The operation of the apparatus thus constructed will be described with reference to FIG. 11. In response to the sync signal pulse L generated by the sync pulse generator 2 shown in FIG. 9, the transmitter 5 transmits a transmitting pulse. The individual pulses of the synchronizing signal pulses L are represented by attaching suffix numerals 1, 2, . . . to the letter L, like L1, L2, . . . . As seen from the output signal R of the ramp circuit shown in FIG. 11, when the sync signal pulses L1, L2, L4, L5, L7 and L9 occur, the output signals R from the ramp circuit are within a given voltage width between the set voltages E51 and E52. Therefore, this means that the propagation of the ultrasonic wave is judged to be in a normal condition. On the other hand, in the case of the remaining sync signal pulses L3, L6 and L8, the R values are not between the set voltages E51 and E52. Accordingly, the successive ultrasonic pulses are propagated in a normal condition in the forward and backward or the backward and forward directions only in the intervals between the sync pulses L1-L2 and L4-L5. Accordingly, a signal W informing that "wave propagation is normal" only in those intervals is produced from the register 42 with a given time delay. In the remaining intervals, L2-L3, L3-L4, L5-L6, L6-L7, L7-L8 and L8-L9, two successive ultrasonic pulses are not propagated in a normal condition. Therefore, a signal W is not produced. As described above, it is only when a succession of forward and backward directional ultrasonic pulses or the backward and forward directional ultrasonic pulses is propagated in a normal state, that the signal W is produced to indicate the normality.

Figure 12:
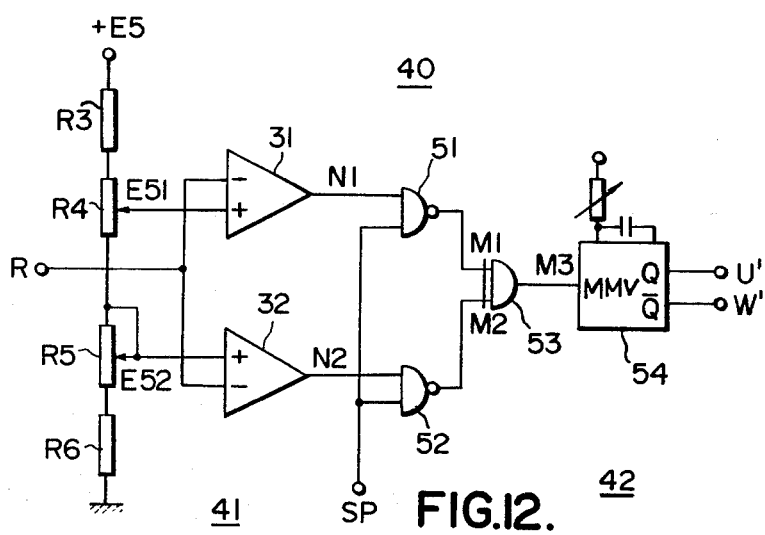
FIG. 12 is a circuit diagram showing another embodiment of the abnormality monitor circuit used in the circuit shown in FIG. 9.

Another embodiment of the abnormality detector 40 is illustrated in FIG. 12. In this embodiment, a register 42 is comprised of a NAND gate 51 receiving an output signal N1 from the comparator 31 and the sampling pulse SP, a NAND gate 52 receiving the signal N2 from the comparator 32 and the sampling pulse SP, and an exclusive OR gate 53 receiving output signals M1 and M2 from the NAND gates 51 and 52, and a retriggerable monostable multivibrator 54, triggered by an output signal M3 from the exclusive OR gate 53. It is now assumed that the pulse width ΔT of a set output pulse from the monostable multivibrator 54 is set longer than the sum of the measuring periods of the measurement in the forward and backward directions. In other words, the pulse width ΔT is longer than two periods of the sampling pulse SP.

Figure 11:
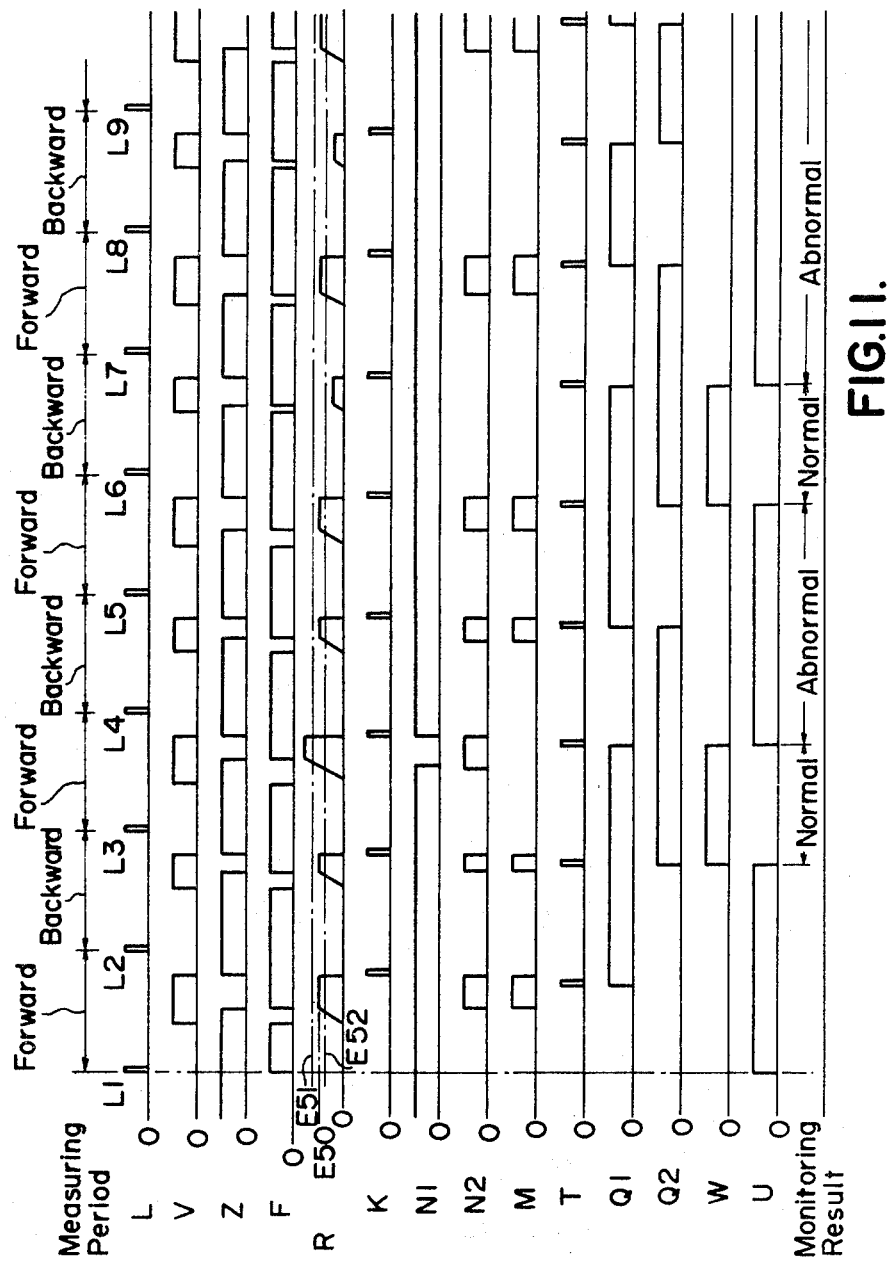
FIG. 11 illustrates signal waveforms at respective portions in the circuits shown in FIGS. 9 and 10 which are useful in explaining the operation of the circuits.
Figure 13:
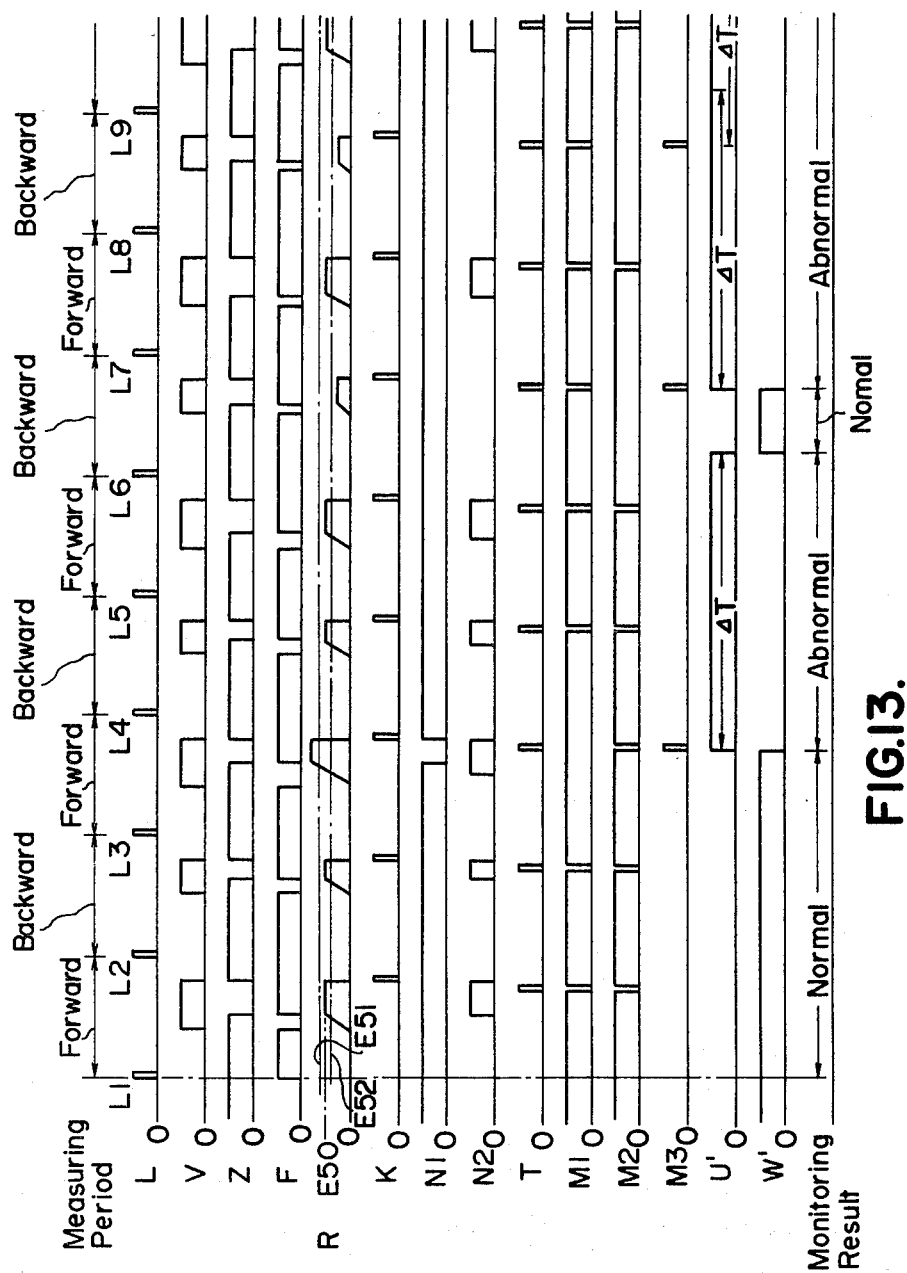
FIG. 13 illustrates signal waveforms at respective portions in the circuit shown in FIG. 12.

In FIG. 13, there is shown output signal waveforms at the respective portions in FIGS. 9 and 12 when the measurement is conducted under the same condition as that in the case of FIG. 11 by using the abnormality detector 40 shown in FIG. 12. As shown in FIG. 13, the monostable multivibrator 54 is retriggerable. Therefore, when ultrasonic pulses are abnormal in succession or alternately, the multivibrator 54 continuously produces an abnormal signal U'. Unlike the embodiment in FIG. 10, the embodiment shown in FIG. 12 can properly adjust the set time ΔT, or an abnormal signal continuation time, and hence it is useful when a long-duration abnormal alarm issuance is needed.

Figure 14:
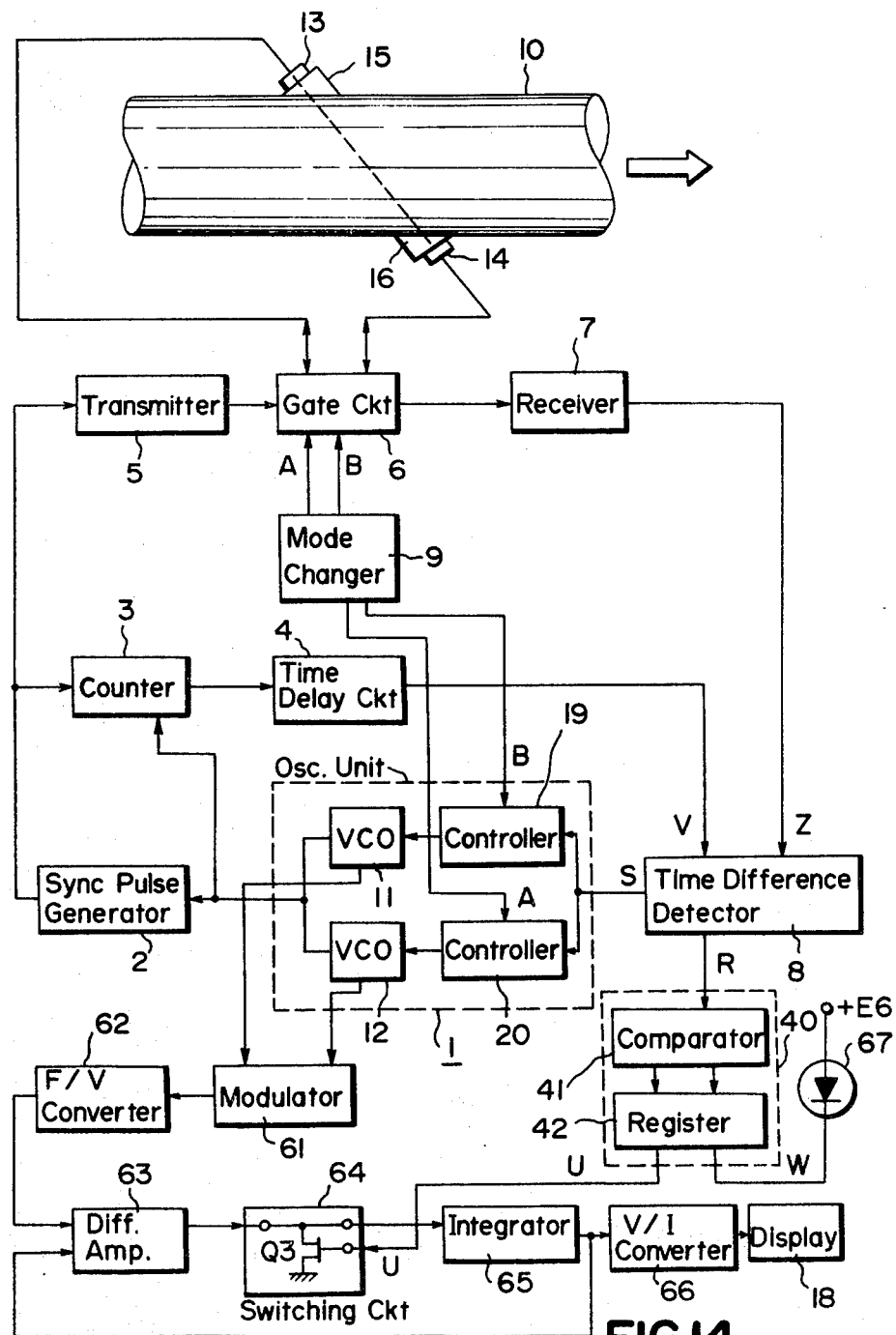
FIG. 14 is a block diagram showing a further embodiment of the ultrasonic flow rate measuring apparatus according to the invention.

A further embodiment of the ultrasonic flow rate measuring apparatus is shown in FIG. 14. In this embodiment, a modulator 61 forms a frequency difference (Δf=f1−f2) between a forward directional oscillating frequency f1 generated by an oscillator 11 and a backward directional oscillating frequency f2 by another oscillator 12. The output signal from the modulator 61 is applied to a frequency to voltage (F/V) converter 62 where it is converted into a corresponding voltage signal. The output signal from the converter 62 is supplied to one of the input terminals of a differential amplifier 63 of which the other input terminal is coupled with an output signal from an integrator 65 to be described later. The output signal from the difference amplifier 63 is applied through a switch circuit 64 to the integrator 65 of which the voltage output signal is in turn converted into a corresponding current signal by a voltage to current (V/I) converter 66. The output signal of the V/I converter is then supplied to the display circuit 18. The switch 64, which may be comprise by a field effect transistor Q3, is controlled to perform switching by the output signal U or U' from the abnormality detector 40. In particular, when the output signal U (or U') is a "1" signal (this indicates abnormal acoustic wave propagation), the transistor Q3 is conductive to prevent the output signal from the differential amplifier 63 from being applied to the integrator 65. In this embodiment, when the propagation of the acoustic wave is abnormal, the previous value is held by the display circuit 18. A light emitting diode 67 receives the output signal W from the abnormality detector 40 to emit light to display a normal state.

As described above, in this embodiment, the propagation state of the ultrasonic wave is checked every measurement in the forward and backward directions so that the check is quickly made, thus ensuring reliable detection of an abnormal propagation of the ultrasonic wave. Furthermore, a signal informing that the wave propagation is normal is produced only when two successive measurements in the forward and backward directions or the backward and forward directions are normal. This is very desirable from a viewpoint of obtaining correct measurements.

While the foregoing description relates to the application of the ultrasonic measuring apparatus according to the invention to only the ultrasonic flow rate measuring apparatus, the apparatus of the invention is preferably applicable to any other proper apparatus such as an ultrasonic level meter. When the invention is applied to the ultrasonic level meter, the measuring medium in the measuring pipe 10 is a liquid, the level of which is to be measured, or the atmosphere above the liquid.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In an ultrasonic measuring apparatus of the type having a pair of transducers disposed oppositely on a pipe through which a fluid to be measured flows and which are so controlled alternately as to convert an input electrical signal to an acoustic signal and to convert a received acoustic signal to a received electrical signal, oscillating means for generating an oscillator output signal having a variable frequency, a counter for counting said oscillator output signal to produce a counter output signal when the count value of said counter reaches a predetermined value, a delay means for delaying said counter output signal and producing a delayed output signal, a transmitter receiving said oscillator output signal for producing said input electrical signal, a time difference detecting means for receiving said delayed output signal and said received electrical signal for detecting the time difference between said delayed output signal and the propagating time required for an ultrasonic wave to propagate through said fluid to be measured, controlling means for controlling the frequency of said oscillating means so as to make said time difference zero, and means for detecting said propagating time in accordance with the frequency of said oscillating means, said ultrasonic measuring apparatus comprising:

comparing means for comparing a voltage signal corresponding to said time difference with first and second set voltages; and monitoring means receiving the comparison result from said comparing means for judging whether said fluid flow is propagated in said pipe in a normal condition or in an abnormal condition.

2. An ultrasonic measuring apparatus as claimed in claim 1, wherein said time difference detecting means produces a difference voltage between a voltage signal corresponding to said time difference and a reference voltage and said difference voltage is applied to said controlling means for controlling the oscillating frequency of said oscillating means so as to make said difference voltage zero, and in said comparing means said first set voltage is set slightly higher than said reference voltage and said second set voltage is set slightly lower than said reference voltage.

3. An ultrasonic measuring apparatus as claimed in claim 2 wherein said time difference detecting means includes a ramp circuit for converting said time difference into a voltage signal and a differential amplifier for controlling the oscillating frequency of said oscillating means on the basis of the difference voltage between said reference voltage and the output voltage from said ramp circuit, said comparing means including a first comparator having a first set voltage for comparing said first set voltage with the output voltage from said ramp circuit, a second comparator having a second set voltage for comparing said second set voltage with the output voltage from said ramp circuit, an AND gate receiving the output signals from said first and second comparators and a D type flip-flop receiving the output signal from said AND gate, thereby detecting whether the amplitude of the output voltage from said ramp circuit is in a range between said first and second set voltages in response to the output signal from said D type flip-flop.

4. In an ultrasonic measuring apparatus of the type having a pair of transducers disposed oppositely on a pipe through which a fluid to be measured flows and which are so controlled alternately as to convert an input electrical signal to an acoustic signal and to convert a received acoustic signal to a received electrical signal, oscillating means for generating an oscillator output signal having a variable frequency, a counter for counting said oscillator output signal to produce a counter output signal when the count value of said counter reaches a predetermined value, a delay means for delaying said counter output signal and producing a delayed output signal, a transmitter receiving said oscillator output signal for producing said input electrical signal, a time difference detecting means for receiving said delayed output signal and said received electrical signal for detecting the time difference between said delayed output signal and the propagating time required for an ultrasonic wave to propagate through said fluid to be measured, controlling means for controlling the frequency of said oscillating means so as to make said time difference zero, means for emitting said ultrasonic wave into said fluid in a forward direction and in a backward direction with respect to the direction of the flow of said fluid in an alternately repeated manner, and means for measuring the flow speed or flow rate of said fluid in accordance with the frequency difference between the oscillating frequencies when said ultrasonic wave is emitted in said forward direction and when said ultrasonic wave is emitted in said backward direction, said ultrasonic measuring apparatus comprising:

a comparator for judging whether a first voltage signal corresponding to the time difference when said ultrasonic pulse is emitted in said forward direction and a second voltage signal corresponding to the time difference when said ultrasonic pulse is emitted in the backward direction, respectively, fall within a predetermined voltage range; and a register for judging whether said first and second voltages fall within said predetermined voltage range in succession, thereby monitoring from an output of said register whether the ultrasonic pulses emitted in the forward and backward direction in succession are propagated normally or not.

5. An ultrasonic measuring apparatus as claimed in claim 4, wherein the difference voltage between the voltage signal corresponding to said time difference and a reference voltage is obtained in said time difference detecting means, the oscillating frequency of said oscillating means is so controlled as to make said difference voltage zero, and the predetermined voltage range in said comparing means is set between a first set voltage slightly higher than said reference voltage and a second set voltage slightly lower than said reference voltage.

6. An ultrasonic measuring apparatus as claimed in claim 5, wherein said comparator includes a first comparator having a first set voltage and a second comparator having a second set voltage, and said register includes a first AND gate receiving the output signals from said first and second comparators, a first D type flip-flop receiving the output signal from said first AND gate, a second D type flip-flop receiving the output signal from said first D type flip-flop, and a second AND gate receiving the output signals from said first D type flip-flop and from said second D type flip-flop.

7. An ultrasonic measuring apparatus as claimed in claim 6, further comprising:

a modulator for forming a frequency difference between the oscillating frequencies of said oscillating means in the forward and backward directions;

a frequency to voltage converter for converting the output signal from said modulator into a corresponding voltage signal;

a differential amplifier receiving at one input terminal the output signal from said frequency to voltage converter; and an integrator receiving through a switch the output signal from said differential amplifier, said differential amplifier receiving at the other input terminal the output signal from said integrator, and the switching operation of said switch being controlled by the output signal from said register, whereby the flow speed or flow rate of said fluid is measured on the basis of the output signal from said integrator.

8. An ultrasonic measuring apparatus as claimed in claim 5, wherein said comparator includes a first comparator having a first set voltage and a second comparator having a second set voltage, and said register includes a first NAND gate receiving a sampling pulse periodically produced and the output signal from said first comparator, a second NAND gate receiving the output signal from said second comparator and said sampling pulse, an exclusive OR gate receiving the output signal from said first NAND gate and the output signal from said second NAND gate, and a retriggerable monostable circuit triggered by the output signal from said exclusive OR circuit and said monostable circuit having an output pulse having a width longer than the sum of the measuring periods in the forward and backward directions.

9. An ultrasonic measuring apparatus as claimed in claim 5, further comprising:
- a modulator for forming a frequency difference between the oscillating frequencies of said oscillating means in the forward and backward directions;
- a frequency to voltage converter for converting the output signal from said modulator into a corresponding voltage signal;
- a differential amplifier receiving at one input terminal the output signal from said frequency to voltage converter; and
- an integrator receiving through a switch the output signal from said differential amplifier, said differential amplifier receiving at the other input terminal the output signal from said integrator, and the switching operation of said switch being controlled by the output signal from said register, whereby the flow speed or flow rate of said fluid is measured on the basis of the output signal from said integrator.

10. An ultrasonic measuring apparatus as claimed in claim 4, wherein said comparator includes a first comparator having a first set voltage and a second comparator having a second set voltage, and said register includes a first AND gate receiving the output signals from said first and second comparators, a first D type flip-flop receiving the output signal from said first AND gate, a second D type flip-flop receiving the output signal from said first D type flip-flop, and a second AND gate receiving the output signals from said first D type flip-flop and from said second D type flip-flop.

11. An ultrasonic measuring apparatus as claimed in claim 10, further comprising:
- a modulator for forming a frequency difference between the oscillating frequencies of said oscillating means in the forward and backward directions;
- a frequency to voltage converter for converting the output signal from said modulator into a corresponding voltage signal;
- a differential amplifier receiving at one input terminal the output signal from said frequency to voltage converter; and
- an integrator receiving through a switch the output signal from said differential amplifier, said differential amplifier receiving at the other input terminal the output signal from said integrator; and
- the switching operation of said switch being controlled by the output signal from said register, whereby the flow speed or flow rate of said fluid is measured on the basis of the output signal from said integrator.

12. An ultrasonic measuring apparatus as claimed in claim 4, wherein said comparator includes a first comparator having a first set voltage and a second comparator having a second set voltage, and said register includes a first AND gate receiving a sampling pulse periodically produced and the output signal from said first comparator, a second NAND gate receiving the output signal from said second comparator and said sampling pulse, an exclusive OR gate receiving the output signal from said first NAND gate and the output signal from said second NAND gate, and a retriggerable monostable circuit triggered by the output signal from said exclusive OR circuit and said monostable circuit having an output pulse having a width longer than the sum of the measuring periods in the forward and backward directions.

13. An ultrasonic measuring apparatus as claimed in claim 4, further comprising:
- a modulator for forming a frequency difference between the oscillating frequencies of said oscillating means in the forward and backward directions;
- a frequency to voltage converter for converting the output signal from said modulator into a corresponding voltage signal;
- a differential amplifier receiving at one input terminal the output signal from said frequency to voltage converter; and
- an integrator receiving through a switch the output signal from said differential amplifier, said differential amplifier receiving at the other input terminal the output signal from said integrator, and the switching operation of said switch being controlled by the output signal from said register, whereby the flow speed or flow rate of said fluid is measured on the basis of the output signal from said integrator.

* * * * *